United States Patent
Yadav et al.

(10) Patent No.: US 9,484,032 B2
(45) Date of Patent: Nov. 1, 2016

(54) METHODS AND SYSTEMS FOR NAVIGATING THROUGH MULTIMEDIA CONTENT

(71) Applicant: XEROX CORPORATION, Norwalk, CT (US)

(72) Inventors: Kuldeep Yadav, Haryana (IN);
Kundan Shrivastava, Karnataka (IN);
Om D Deshmukh, Karnataka (IN)

(73) Assignee: Xerox Corporation, Norwalk, CT (US)

( * ) Notice: Subject to any disclaimer, the term of this patent is extended or adjusted under 35 U.S.C. 154(b) by 145 days.

(21) Appl. No.: 14/523,966

(22) Filed: Oct. 27, 2014

(65) Prior Publication Data

US 2016/0118060 A1     Apr. 28, 2016

(51) Int. Cl.
| | | |
|---|---|---|
| *G10L 15/26* | (2006.01) | |
| *G10L 25/57* | (2013.01) | |
| *G06F 3/0484* | (2013.01) | |
| *G06F 17/28* | (2006.01) | |
| *G10L 15/18* | (2013.01) | |
| *G10L 21/10* | (2013.01) | |
| *G10L 15/08* | (2006.01) | |

(52) U.S. Cl.
CPC .......... *G10L 15/26* (2013.01); *G06F 3/04842* (2013.01); *G06F 17/28* (2013.01); *G10L 25/57* (2013.01); *G10L 15/1807* (2013.01); *G10L 21/10* (2013.01); *G10L 2015/088* (2013.01)

(58) Field of Classification Search
CPC ........ G10L 25/57; G10L 15/26; G06F 17/28
USPC ............................................ 704/235, 270, 9
See application file for complete search history.

(56) References Cited

U.S. PATENT DOCUMENTS

| | | | |
|---|---|---|---|
| 5,136,655 A | | 8/1992 | Bronson |
| 6,772,120 B1 * | | 8/2004 | Moreno .............. G06F 17/2715 704/256 |
| 8,488,916 B2 | | 7/2013 | Terman |
| 2010/0141655 A1 | | 6/2010 | Belinsky et al. |
| 2011/0040562 A1 | | 2/2011 | Doyle et al. |
| 2011/0307247 A1 | | 12/2011 | Moroney |
| 2012/0179465 A1 | | 7/2012 | Cox et al. |
| 2013/0272676 A1 | | 10/2013 | Mo et al. |

(Continued)

OTHER PUBLICATIONS

Guo, Philip J., and Katherina Reinecke. "Demographic Differences in How Students Navigate Through MOOCs.", Learning at Scale Conference, 2014.
Guo, Juho Kim1 Philip J., Daniel T. Seaton3 Piotr Mitros Krzysztof, and Z. Gajos5 Robert C Miller. "Understanding In-Video Dropouts and Interaction Peaks in Online Lecture Videos.", Learning at Scale Conference, 2014.

(Continued)

*Primary Examiner* — Shaun Roberts

(57) ABSTRACT

The disclosed embodiments illustrate methods and systems for processing multimedia content. The method includes extracting one or more words from an audio stream associated with multimedia content. Each word has associated one or more timestamps indicative of temporal occurrences of said word in said multimedia content. The method further includes creating a word cloud of said one or more words in said multimedia content based on a measure of emphasis laid on each word in said multimedia content and said one or more timestamps associated with said one or more words. The method further includes presenting one or more multimedia snippets, of said multimedia content, associated with a word selected by a user from said word cloud. Each of said one or more multimedia snippets corresponds to said one or more timestamps associated with occurrences of said word in said multimedia content.

30 Claims, 5 Drawing Sheets

(56) References Cited

U.S. PATENT DOCUMENTS

| | | | |
|---|---|---|---|
| 2014/0019119 A1* | 1/2014 | Liu | G06F 17/21 704/9 |
| 2014/0282244 A1* | 9/2014 | Speer | G06F 3/04842 715/811 |
| 2015/0262401 A1* | 9/2015 | Zes | G06T 11/60 345/636 |

OTHER PUBLICATIONS

Cui, Weiwei, Yingcai Wu, Shixia Liu, Furu Wei, Michelle X. Zhou, and Huarnin Qu. "Context preserving dynamic word cloud visualization." In Pacific Visualization Symposium (PacificVis), *2010 IEEE*, pp. 121-128. IEEE, 2010.

Castelia, Quim, and Charles Sutton. "Word Storms: Multiples of Word Clouds for Visual Comparison of Documents." *arXiv preprint arXiv:1301.0503* (2013).

* cited by examiner

METHODS AND SYSTEMS FOR NAVIGATING THROUGH MULTIMEDIA CONTENT

TECHNICAL FIELD

The presently disclosed embodiments are related, in general, to processing multimedia content. More particularly, the presently disclosed embodiments are related to methods and systems for navigating through the multimedia content.

BACKGROUND

Multimedia content may relate to an audio or a video content that may be played to one or more users. The one or more users may access the multimedia content over various sources such as CD, DVD, websites, etc. During the playback of the multimedia content, the one or more users may have an option to start the playback of the multimedia content from a point of interest. The point of interest may correspond to a particular part of the multimedia content that may be of importance to the user. Usually, a seek-bar is displayed to the user along with the multimedia content that may enable the user to navigate through the multimedia content. The seek-bar may be indicative of duration of the playback of the multimedia content.

Usually the user may employ hit and trial method by either forwarding or rewinding the multimedia content (using the seek bar) in order to access the point of interest. This may be cumbersome task for the user.

SUMMARY

According to embodiments illustrated herein, there is provided a method for processing a multimedia content. The method includes extracting one or more words from at least an audio stream associated with a multimedia content. Each of said one or more words has associated one or more timestamps indicative of temporal occurrences of each of said one or more words in said multimedia content The method includes creating a word cloud of said one or more words in said multimedia content based at least on a measure of emphasis laid on each of said one or more words in said multimedia content and said one or more timestamps associated with said one or more words. The method further includes presenting one or more multimedia snippets, of said multimedia content, associated with a word selected by a user from said word cloud. Each of said one or more multimedia snippets corresponds to said one or more timestamps associated with occurrences of said word in said multimedia content. The method is performed by one or more processors.

According to embodiments illustrated herein, there is provided a system for processing a multimedia content. The system includes one or more processors operable to extract one or more words from at least an audio stream associated with a multimedia content. Each of said one or more words has associated one or more timestamps indicative of temporal occurrences of each of said one or more words in said multimedia content. The system includes one or more processors operable to create a word cloud of said one or more words in said multimedia content based at least on a measure of emphasis laid on each of said one or more words in said multimedia content and said one or more timestamps associated with said one or more words. The one or more processors are further operable to present one or more multimedia snippets, of said multimedia content, associated with a word selected by a user from said word cloud. Each of said one or more multimedia snippets corresponds to said one or more timestamps associated with occurrences of said word in said multimedia content.

According to embodiments illustrated herein, there is provided a computer program product for use with a computing device. The computer program product comprises a non-transitory computer readable medium, the non-transitory computer readable medium stores a computer program code for processing a multimedia content. The computer program code is executable by one or more processors to extract one or more words from at least an audio stream associated with a multimedia content. Each of said one or more words has associated one or more timestamps indicative of temporal occurrences of each of said one or more words in said multimedia content. The computer program code is executable by one or more processors to create a word cloud of said one or more words in said multimedia content based at least on a measure of emphasis laid on each of said one or more words in said multimedia content and said one or more timestamps associated with said one or more words. The computer program code is further executable by the one or more processors to present one or more multimedia snippets, of said multimedia content, associated with a word selected by a user from said word cloud. Each of said one or more multimedia snippets corresponds to said one or more timestamps associated with occurrences of said word in said multimedia content.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
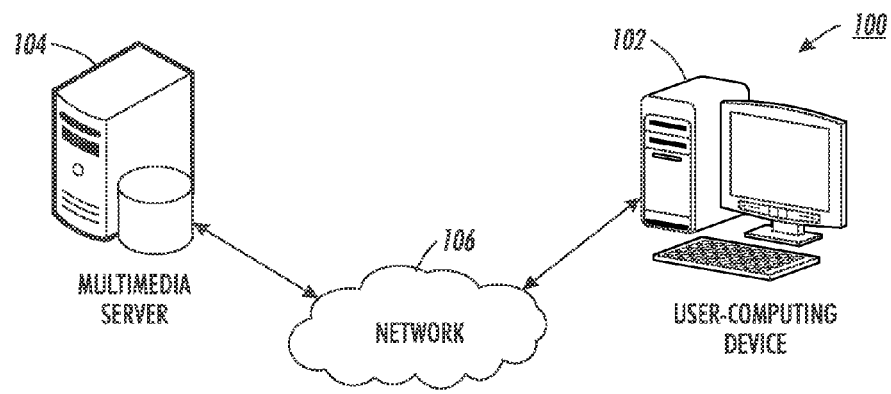
FIG. 1 is a block diagram illustrating a system environment in which various embodiments may be implemented.

The present disclosure is best understood with reference to the detailed figures and description set forth herein.

Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

DEFINITIONS

The following terms shall have, for the purposes of this application, the meanings set forth below.

"Multimedia content" refers to at least one of, but not limited to, audio, video, text, image, or animation. In an embodiment, the multimedia content may be played through a media player such as VLC Media Player, Windows Media Player, Adobe Flash Player, Apple QuickTime Player, etc., on a computing device. In an embodiment, the multimedia content may be downloaded or streamed from a multimedia server to the computing device. In an alternate embodiment, the multimedia content may be stored on a media storage device such as Hard Disk Drive, CD Drive, Pen Drive, etc., connected to (or inbuilt within) the computing device.

"Multimedia snippets" refer to one or more portions that are extractable from the multimedia content. In an embodiment, the multimedia snippets may correspond to a set of frames or snapshots that are extracted from the multimedia content. In an embodiment, such frames or snapshots may be encoded in accordance to one or more encoding algorithms such as, but not limited to, MPEG4, AVI, etc.

"User" refers to an individual who wishes to view the multimedia content. In an embodiment, the user may select a word from a word cloud associated with the multimedia content. Based on the selected word, the user may be displayed the multimedia snippets corresponding to the word from the multimedia content.

"Emphasis laid on one or more words" refers to a stress or focus laid on the one or more words within the multimedia content.

"Word cloud" refers to a multidimensional graph that is used for representing one or more words in accordance to a temporal spread and a cumulative temporal occurrence of the one or more words within the multimedia content. In addition, the font size and the font color of each of the one or more words may vary based on the count of occurrences of the one or more words in the multimedia content and the emphasis laid on the one or more words in the multimedia content, respectively.

"Seek bar" refers to a slider type user interface element for navigating through the multimedia content.

"Stemming" is process of transforming a word to a root form. The stemming may transform each of the one or more words associated with the multimedia content to a stem form. For example, if the one or more words include words such as "finding", "find", "finds", etc. In such scenario, each of the one or more words are transformed to respective root form "find".

"Timestamp" refers to a time instance associated with an occurrence of a word in the multimedia content.

"Gestures" refer to user input on a user interface or a computing device that may invoke a command or an instruction to be executed on the computing device. Some examples of the gestures may include, but are not limited to, hovering a mouse cursor, clicking, creating a predetermined pattern, etc.

FIG. 1 is a block diagram illustrating a system environment 100 in which various embodiments may be implemented. The system environment 100 includes a user-computing device 102, a multimedia server 104, and a network 106. Various devices in the system environment 100 (e.g., the user-computing device 102, the multimedia server 104) may be interconnected over the network 106.

The user-computing device 102 may refer to a computing device, used by the user, to perform one or more operations. In an embodiment, one of the operation may correspond to viewing the multimedia content. In an embodiment, the user-computing device 102 may receive the multimedia content from the multimedia server 104. In an alternate embodiment, the user-computing device 102 may include suitable hardware that may be capable of reading the one or more storage mediums (e.g., CD, DVD, or Hard Disk). Such storage mediums may include the multimedia content. In an embodiment, the user-computing device 102 may extract one or more words from an audio stream associated with the multimedia content. Based on the extracted words of the multimedia content, the user-computing device 102 may create a word cloud of the one or more words. Further, the user-computing device 102 may present a user interface to the user. In an embodiment, a first portion of the user interface is reserved for the display of the multimedia content. Further, a second portion of the user interface may be reserved for the display of the word cloud. The user-computing device 102 may receive an input from the user for selection of a word from the word cloud. Based on the selection of the word, the user may be able to navigate through the multimedia content. The navigation through the multimedia content based on the selection of the word has been described later in conjunction with FIG. 3. The user-computing device 102 may be realized through a variety of computing devices, such as a desktop, a computer server, a laptop, a personal digital assistant (PDA), a tablet computer, and the like.

The multimedia server 104 may refer to a device or a computer that may include a repository of the one or more multimedia content. In an embodiment, the multimedia server 104 may correspond to a streaming server that may be capable of delivering the multimedia content to the user-computing device 102. In an embodiment, the multimedia server 104 may transmit the multimedia content to the user-computing device 102 using one or more network protocols such as TCP/IP, UDP, FTP, etc.

A person with ordinary skill in the art would understand that the scope of the disclosure is not limited to illustrating the multimedia server 104 as a separate entity. In an embodiment, the functionality of the multimedia server 104 may be implementable on/integrated with the user-computing device 102.

The network 106 corresponds to a medium through which content and messages flow between various devices of the system environment 100 (e.g., the user-computing device 102, and the multimedia server 104). Examples of the network 106 may include, but are not limited to, a Wireless Fidelity (Wi-Fi) network, a Wide Area Network (WAN), a Local Area Network (LAN), or a Metropolitan Area Network (MAN). Various devices in the system environment 100 can connect to the network 106 in accordance with various wired and wireless communication protocols such as Transmission Control Protocol and Internet Protocol (TCP/IP), User Datagram Protocol (UDP), and 2G, 3G, or 4G communication protocols.

Figure 2:
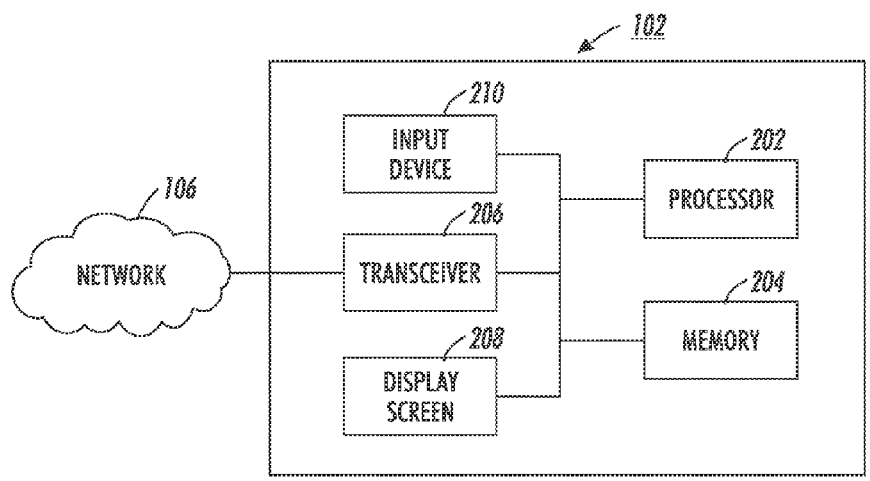
FIG. 2 is a block diagram illustrating a multimedia server, in accordance with at least one embodiment.

FIG. 2 is a block diagram illustrating a user-computing device 102, in accordance with at least one embodiment.

The user-computing device 102 includes a processor 202, a memory 204, a transceiver 206, a display screen 208, and an input device 210. The processor 202 is coupled to the memory 204, the transceiver 206, the display screen 208, and the input device 210. The transceiver 206 may connect to the network 106.

The processor 202 includes suitable logic, circuitry, and/or interfaces that are operable to execute one or more instructions stored in the memory 204 to perform predetermined operations. The processor 202 may be implemented using one or more processor technologies known in the art. Examples of the processor 202 include, but are not limited to, an x86 processor, an ARM processor, a Reduced Instruction Set Computing (RISC) processor, an Application Specific Integrated Circuit (ASIC) processor, a Complex Instruction Set Computing (CISC) processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It is apparent to a person with ordinary skills in the art that the one or more instructions stored in the memory 204 enable the hardware of the system 104 to perform the predetermined operations.

The transceiver 206 transmits and receives messages and data to/from various components of the system environment 100 (e.g., the multimedia server 104) over the network 106. Examples of the transceiver 206 may include, but are not limited to, an antenna, an Ethernet port, a USB port, or any other port that can be configured to receive and transmit data. The transceiver 206 transmits and receives data/messages in accordance with the various communication protocols, such as, TCP/IP, UDP, and 2G, 3G, or 4G communication protocols.

The display screen 208 may comprise suitable logic, circuitry, interfaces, and/or code that may be operable to render a user interface. Further, the display screen 208 may be capable of rendering the multimedia content. In an embodiment, the display screen 208 may be realized through several known technologies, such as, Cathode Ray Tube (CRT) based display, Liquid Crystal Display (LCD), Light Emitting Diode (LED) based display, Organic LED display technology, and Retina display technology. In an alternate embodiment, the display screen 208 may be capable of receiving input from the user of the user-computing device 102. In such a scenario, the display screen 208 may be a touch screen that enables the user to provide input. In an embodiment, the touch screen may correspond to at least one of a resistive touch screen, capacitive touch screen, or a thermal touch screen. In an embodiment, the display screen 208 may receive input through a virtual keypad, a stylus, a gesture, and/or touch based input.

The input device 210 may comprise suitable logic, circuitry, interfaces, and/or code that may be operable to receive an input from the user. The input device 210 may be operable to communicate with the processor 202. Examples of the input devices may include, but are not limited to, a touch screen, a keyboard, a mouse, a joystick, a microphone, a camera, a motion sensor, a light sensor, and/or a docking station.

Figure 3:
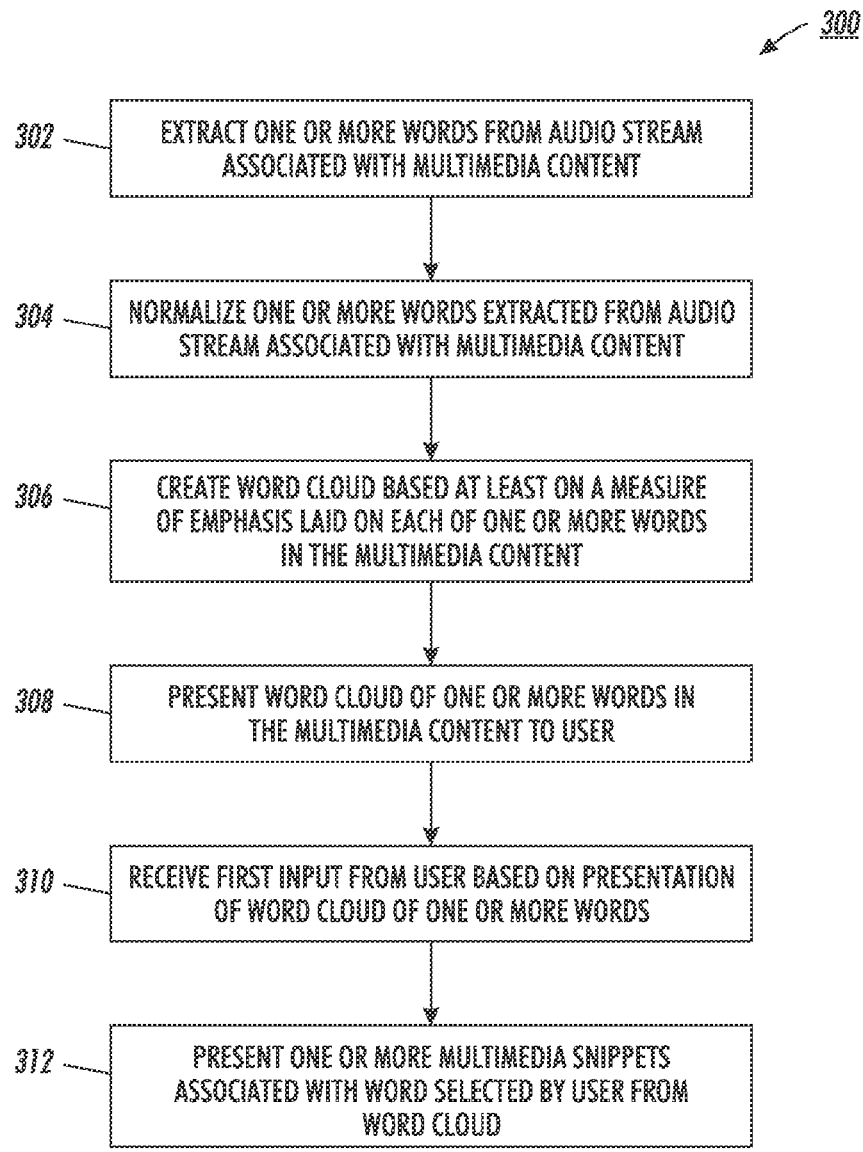
FIG. 3 is a flowchart illustrating a method for processing a multimedia content, in accordance with at least one embodiment.

FIG. 3 is a flowchart 300 illustrating a method for processing a multimedia content, in accordance with at least one embodiment. The flowchart 300 is described in conjunction with FIG. 1.

At step 302, the one or more words are extracted from the multimedia content. In an embodiment, the processor 202 extracts the one or more words. In an embodiment, prior to extracting the one or more words, the user-computing device 102 may receive a multimedia content from the multimedia server 104, through the transceiver 206. In an alternate embodiment, the user-computing device 102 may access the multimedia content from the storage devices (not shown) or the removable mediums associated with the user-computing device 102. Thereafter, the processor 202 may extract at least an audio stream from the multimedia content using one or more known digital audio extraction techniques. Further, the processor 202 may employ one or more known Automatic Speech Recognition (ASR) techniques to extract the one or more words. In addition, the processor 202 may further determine one or more timestamps associated with each of the one or more words in the multimedia content. The one or more timestamps may be indicative of temporal occurrence of each of the one or more words in the multimedia content.

For example, the multimedia content corresponds to a movie. The processor 202 may extract the audio stream associated with the movie. For instance, the audio stream include a voice reciting a phrase "Martians on Mars". If the duration of the video is 5 minutes, in which the term "Martians" is recited at time stamp of 2 minutes 3 seconds and the term "Mars" has been recited at 2 minutes 4 seconds, the processor 202 may extract the terms "Mars" and "Martians" (from the audio stream using ASR techniques) along with the respective timestamps of 2 minutes 3 seconds and 2 minutes 4 seconds, respectively.

In an alternate embodiment, the multimedia content may include embedded captions. Such captions may correspond to at least a transcript of at least the audio in the multimedia content. In such a scenario, the text transcript may be used for extracting the one or more words.

In another alternate embodiment, the storage device (from which the multimedia content is accessed) may further include a subtitle file. In an embodiment, the subtitle file may include time-aligned transcript of the audio in the multimedia content. Such file may include one or more phrases and corresponding timestamps indicative of occurrence of the one or more phrases in the multimedia content. The processor 202 may extract the one or more words from such file.

In an embodiment, the processor 202 may store the extracted one or more words and corresponding timestamps in an index file. In an embodiment, the index file may correspond to an xml file or a look up table that may be stored in the memory 204.

At step 304, the one or more words extracted from the audio stream associated with the multimedia content are normalized. In an embodiment, the processor 202 normalizes the one or more words. In an embodiment, the processor 202 may employ one or more text-processing techniques to normalize the one or more words. In an embodiment, normalization may involve removing stop words, or by transforming each of the one or more words in the multimedia content to stem form.

Normalization by Removing Stop Words

The stop words may consist of high-frequency function words such as, but are not limited to, "is", "an", "the", and "from". Such high frequency words may not be relevant or of interest to the user. Therefore, the high-frequency function words are removed. For example, if the multimedia content consists of a string such as "Receive an input from the user", the multimedia server 104 may remove stop words such as 'an' and 'the' from the string associated with the multimedia content.

Normalization Through Stemming

Stemming is process of transforming a word to a root form. The stemming may transform each of the one or more words associated with the multimedia content to a stem form. For example, if the one or more words include words such as "finding", "find", "finds", etc. In such cases, the multimedia server 104 transforms each of the word to respective root form "find".

In another scenario, there may exist words that cannot be transformed to the root form. For example, if the multimedia content consist of words such as "course", "courses", etc. The processor 202 transforms each of the word to "cours". Therefore, stemming of such words lead to nonsensical words that may reduce readability of the words. Thus, in order to overcome such type of stemming, the processor 202 may employ reverse stemming. The reverse stemming transforms each of stem word (i.e., nonsensical words) to an original word form based on a frequency count of the nonsensical stem word. As discussed in the above example, the processor 202 transforms each "course", "courses" words to "cours" which is difficult to read or is not understandable. The processor 202 may determine such non-understandable stem words. In an embodiment, the processor 202 may utilize a dictionary to identify such words. In an embodiment, the dictionary may be stored in the memory 204. In an embodiment, such non-understandable stem words may not be present in the dictionary. Post identifying such non-understandable stem words, the processor 202 determines a count of occurrence of such non-understandable stem words (e.g., cours). For example, if "course" occurred 3 times and "courses" occurred "4 times", the count for the stem word "cours" is 7 times. The processor 202 may convert such non-understandable stem words to their original form based on the count of original words. Hence, all the occurrence of word "cours" will be converted to "courses", as the occurrence of word "courses" is more than the word "course".

A person having ordinary skill in the art would appreciate that the scope of the disclosure is not limited to above disclosed normalization techniques. In an embodiment, the processor 202 may employ other normalization techniques such as by expanding abbreviations, by converting digits to textual forms, etc. without departing from the scope of the disclosure.

At step 306, a word cloud of the one or more words is created. In an embodiment, the processor 202 creates the word cloud. A person having ordinary skill in the art would appreciate that the one or more words may correspond to the stemmed words (refer step 304). However, the scope of the disclosure is not limited to creating the word cloud using the one or more stemmed words. In an embodiment, the one or more original extracted words may be used for creating the word cloud.

Prior to creating the word cloud, the processor 202 may determine a cumulative temporal occurrence of each word in the one or more words. In an embodiment, the processor 202 determines the timestamp associated with each of the one or more words. Thereafter, for a word from the one or more words, the processor 202 determines timestamps of all the occurrences of the word. Thereafter, the processor 202 may determine at least one of a mean, variance, and/or average of the one or more timestamps to obtain the cumulative temporal occurrence of the word. For example, the following table illustrates the one or more words and corresponding timestamps:

TABLE 1

One or more words and corresponding timestamps

| One or more words | Timestamps (seconds) |
|---|---|
| Course | 52 |
| Find | 60 |
| Course | 120 |
| Course | 122 |
| English | 150 |
| Find | 180 |

Referring to Table 1, the processor 202 may determine the median of all timestamps associated with the occurrences of the term "course" as 120 seconds. Similarly, the processor 202 may determine average of all the timestamps correspond to the occurrence of word "course" as 98 seconds. The processor 202 may either consider the average or the median as the cumulative temporal occurrence of the word. Similarly, the processor 202 may determine the cumulative temporal occurrence of the remaining one or more words.

In an embodiment, the cumulative temporal occurrence of each word in the one or more words may be determined through the time-aligned subtitles in the multimedia content, as discussed in the step 302.

Further, the processor 202 determines temporal spread of each of the one or more words. In an embodiment, the processor 202 determines variance of the timestamps corresponding to the occurrences of the one or more words. Further, the processor 202 determines the count of occurrences of each of the one or more words. Referring to Table 1, the count of occurrences of word "course" is 3.

In an embodiment, the processor 202 may further determine emphasis laid on each of the one or more words in the multimedia content. In order to determine the emphasis laid on each of the one or more words, the processor 202 may analyze the spectrum of the audio stream and the temporal characteristics of the audio stream. In an embodiment, the processor 202 may analyze the spectrum of the audio stream at the timestamp (determined in the step 302) associated with the occurrence of a word. In an embodiment, the processor 202 may determines one or more parameters, associated with the spectrum, such as, frequency of audio spectrum at the timestamp, amplitude of the audio spectrum. The one or more parameters may be deterministic of at least one of a speech rate, a volume or a pitch of the speaker, a pauses in the audio stream, etc., which in turn is used by the processor to determine the measure of emphasis laid on the word. In an embodiment, the processor 202 may employ any known speech processing techniques to determine the emphasis laid on each of the one or more words.

Post determining the cumulative temporal occurrence, the temporal spread of each of the one or more words and the emphasis laid on each of the one or more words, the processor 202 creates the word cloud. In an embodiment, the word cloud corresponds to an arrangement of the one or more words in a multidimensional graph in accordance respective cumulative temporal occurrence, temporal spread, count of occurrences, and emphasis laid. In an embodiment, the multidimensional graph has four dimensions. The different dimensions of the word cloud has been explained later in conjunction with FIG. 4.

At step 308, the word cloud is presented to the user. In an embodiment, the processor 202 may instruct the display screen 208 to display the word cloud to the user in the user interface. In an embodiment, the processor 202 may further display the multimedia content to the user in the user interface. In an embodiment, the user interface may include a first portion that is used by the processor 202 to display the multimedia content. Further, the processor 202 may use a second portion to display the word cloud. The user interface has been described later in conjunction with FIG. 5.

A person having ordinary skill in the art would appreciate that the scope of the disclosure is not limited to displaying of the multimedia content in the user interface that includes the word cloud. In an embodiment, the multimedia content may be displayed on a separate user interface, which is different from the user interface of the word cloud. Further, the person skilled in the art would understand that any known media player may be used to display the multimedia content. Some of known media players may include, but are not limited to, Windows Media Player, Adobe Flash Player, VLC player, etc. In another embodiment, the processor 202 may use a plugin of the media player to display the multimedia content. Furthermore, a person having ordinary skill in the art would understand that the media player may include a seek bar that is used for navigating through the multimedia content. In addition, the media player may include radio buttons to control the playback of the multimedia content. Some examples of the radio buttons may include, but are not limited to, play, pause, fast forward, rewind, etc.

At step 310, a first input is received from the user. In an embodiment, the user may provide input through the input device 210 of the user-computing device 102. In an embodiment, the first input corresponds to a selection of a word from the word cloud. In an embodiment, the user may have performed one or more gestures on the user interface to select the word. The one or more gestures may include, but are not limited to, hovering the mouse cursor over the word, highlighting the word, clicking on the word using the mouse cursor, and so on.

A person having ordinary skill in the art would understand that the scope of the disclosure is not limited to providing the above mentioned one or more gestures. In an embodiment, any other gestures may be used for providing the first input.

In an embodiment, based on the selection of the word, the processor 202 may generate an audio signal that is audible to the user, through the speaker of the user-computing device 102. The audio signal may be at least a pronunciation of the selected word.

At step 312, one or more multimedia snippets are presented. In an embodiment, the processor 202 is configured to present the one or more multimedia snippets on the display screen 208. Prior to displaying the multimedia snippets, the processor 202 may determine the timestamp of occurrences of the selected word throughout the multimedia content. For example, referring to Table 1, if the user provides the first input (in step 310) to select the word "course", the processor 202 may determine the corresponding timestamps of the occurrence of the word "course" as 52 seconds, 120 seconds, and 122 seconds. Thereafter, the processor 202 may extract frames from the multimedia content at the determined timestamps. For instance, the processor 202 may extract the frame occurring at 52 seconds. Such frames correspond to multimedia snippets.

In another embodiment, the processor 202 may extract a set of frames in a predetermined time window around the timestamp. For example, if the predetermined time window is of 5 seconds, the set of frames (of the multimedia content) in time window from 50-54 seconds are extracted by the processor 202. The processor 202 thereafter, may encode the set of frames to create the multimedia snippets.

The processor 202 may present the multimedia snippets in the third portion of the user interface.

In addition, the processor 202 may highlight the seek bar of the media player (described in the step 308) at the determined timestamps. In an embodiment, the processor 202 may highlight the predetermined time window in the seek bar. In an embodiment, the predetermined time window may include at least the determined timestamps.

In an embodiment, the user may browse through the one or more multimedia snippets (displayed in the third portion of the user interface) to determine the portion of multimedia content that is of interest to the user. The user may provide an input to select a multimedia snippets from the one or more multimedia snippets. The selected multimedia snippets may be of interest to the user. On receiving the input from the user, the processor 202 may determine the timestamp of the multimedia snippets. The processor 202 starts the playback of the multimedia content from the determined timestamp.

Figure 4:
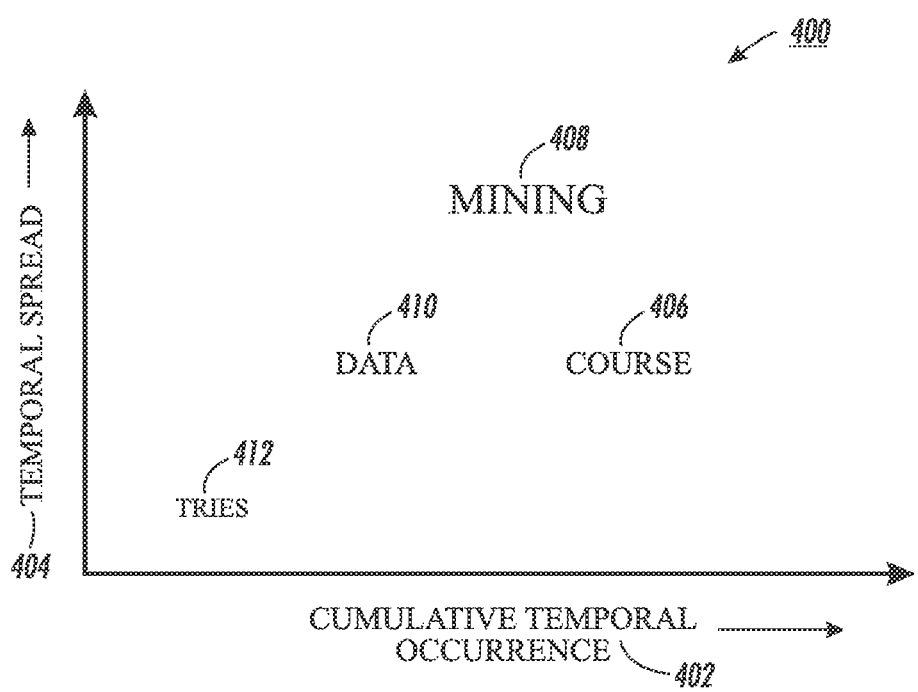
FIG. 4 is a multidimensional graph illustrating an example of word cloud, in accordance with at least one embodiment.

FIG. 4 is a multidimensional graph 400 illustrating an example of word cloud, in accordance with at least one embodiment. The multidimensional graph 400 is described in conjunction with FIG. 3.

The multidimensional graph 400 represents the cumulative temporal occurrence of the word as the x-axis (depicted by 402). Further, the multidimensional graph 400 represents the temporal spread as the y-axis (depicted by 404). As discussed in the step 306, the processor 202 determines the cumulative temporal occurrence and the temporal spread for each of the one or more words throughout the multimedia content. The words are placed in the multidimensional graph 400 based on the respective values of the cumulative temporal occurrence and the temporal spread. For instance, the processor 202 may place the one or more words along the x-axis of the multidimensional graph 400 based on the value of the cumulative temporal occurrence. The position of the word with respect to x-axis is deterministic of relative position of occurrence of the word in the multimedia content. For instance, the word "tries" (depicted by 412) is at the left with respect to x-axis, therefore, the word "tries" may occur in the beginning of the multimedia content. Similarly, words on the right (with respect to x-axis) may occur at the end of the multimedia content.

For instance, the processor 202 may place the one or more words along the y-axis of the multidimensional graph 400 based on the respective values of the temporal spread. The position of the word with respect to y-axis is deterministic of spread of the word throughout the multimedia content. For instance, the word "mining" (depicted by 408) is at top with respect to other words in the multidimensional graph 400, therefore, the word "mining" (depicted by 408) has a wide spread throughout the multimedia content. Similarly, words at bottom (with respect to y-axis) are highly localized. For instance, the word "tires" (depicted by 412) is at the bottom left corner of the multidimensional graph 400.

Therefore, an inference can be drawn, that the word "tries" (depicted by 412) is highly localized and is present at the start of the multimedia content.

Further, the one or more words in the multidimensional graph 400 may have different font size. In an embodiment, the font size of the word may be directly proportional to the count of occurrences of the word in the multimedia content. In an embodiment, more the number of occurrences, more is the font size of the respective word. For instance, the word "mining" (depicted by 408) has largest font size among the rest of the words in the multidimensional graph 400, therefore the word "mining" (depicted by 408) has occurred maximum number of times in the multidimensional graph 400.

In an embodiment, the one or more words in the multidimensional graph 400 may have different colors to represent emphasis laid on each of the one or more words in the multimedia content. For instance, the word "data" (depicted by 410) is represented by red color in the multidimensional graph 400. Therefore, the word "data" is more emphasized in the multimedia content. The colors may include, but are not limited to, red, green, orange, or yellow.

The processor 202 may further place the one or more words in the multidimensional graph 400 with respect to the y axis (depicted by 404). As discussed, the y axis is representative of the temporal spread of the one or more words. A word placed at the top (w.r.t. to the y-axis) is representative of a wider span of the word throughout the multimedia content. For example, word "mining" (depicted by 408) is at the top with respect to other words in the multidimensional graph 400. This may be indicative that the word mining (depicted by 408) has wider span throughout the multimedia content.

Figure 5:
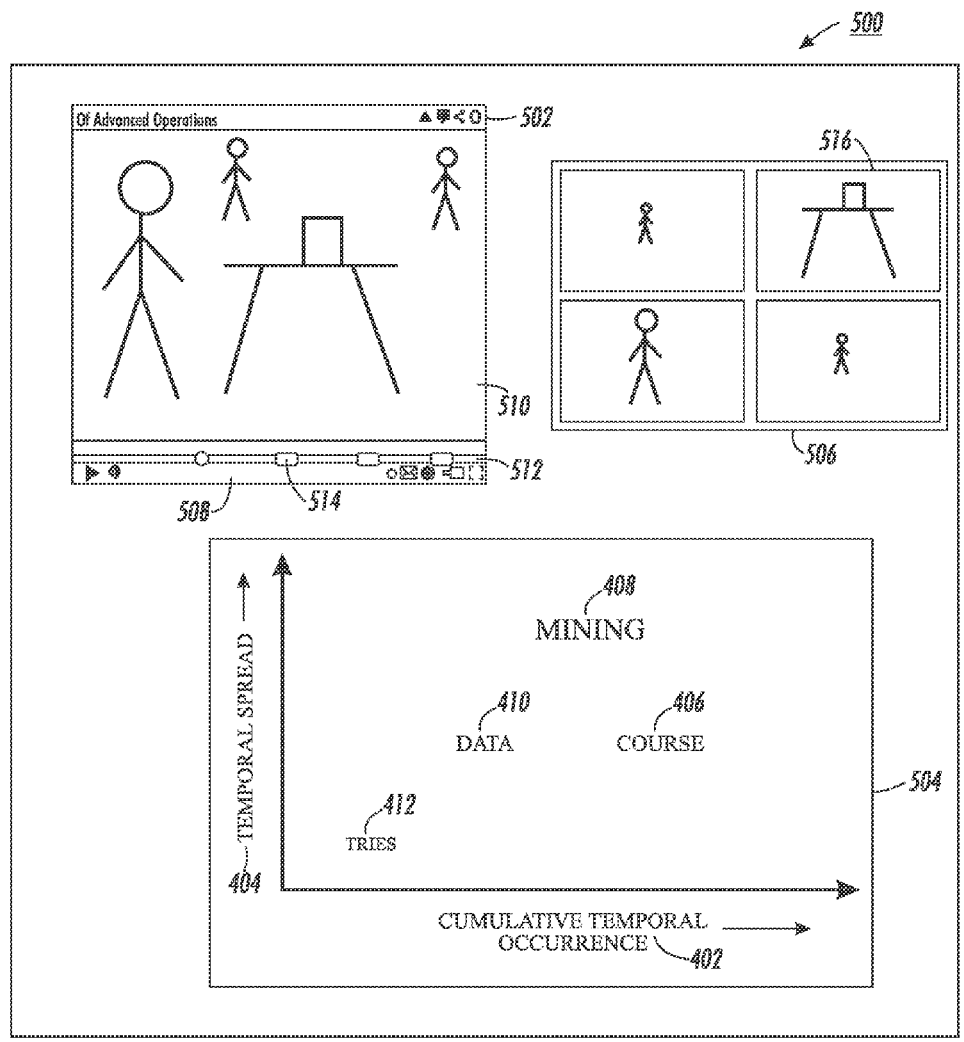
FIG. 5 is an example user interface, in accordance with at least one embodiment.

FIG. 5 is an example user interface 500, in accordance with at least one embodiment. The user interface 500 has been described in conjunction with FIG. 3 and FIG. 4.

The user interface 500 include a first portion 502, a second portion 504, and a third portion 506. The first portion includes a media player 508. In an embodiment, the media player 508 presents a multimedia content 510. The media player 508 further includes seek bar 512 that may be used by the user to navigate through the multimedia content 510.

The second portion 504 is used for presenting the word cloud in the multidimensional graph 400. The user may provide the first input in the word cloud to select the word. The third portion 506 of the user interface is configured to display one or more multimedia snippets (depicted by 516) to the user.

Based on the selected word, seek bar 512 is highlighted by the processor 202, as discussed in step 312 (depicted by 514).

Figure 6:
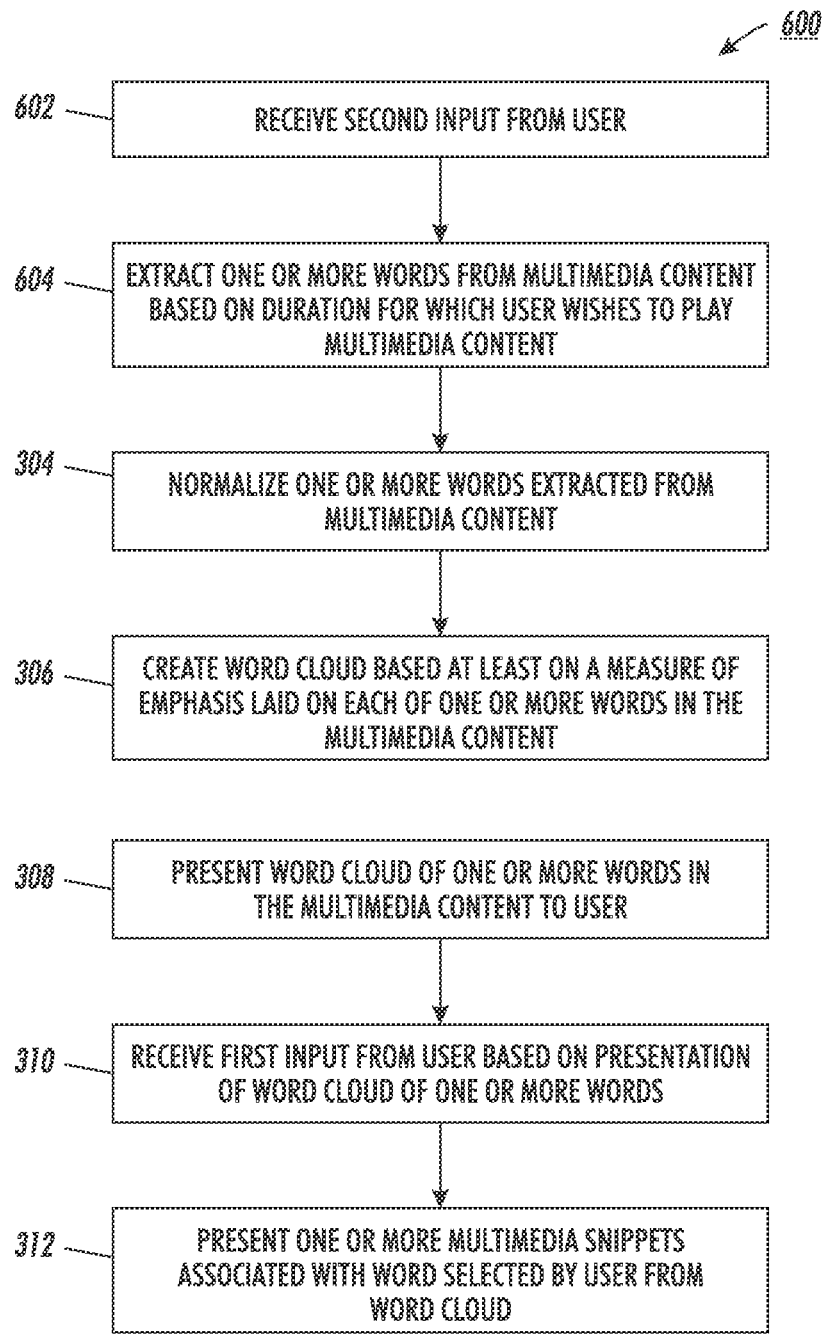
FIG. 6 is another flowchart illustrating another method for creating a word cloud, in accordance with at least one embodiment.

FIG. 6 is another flowchart 600 illustrating another method for creating a word cloud, in accordance with at least one embodiment. The flowchart 600 has been described in conjunction with FIG. 3, FIG. 4, and FIG. 5.

In certain scenario, the user may not wish to play a multimedia content from the start. In such a scenario, usually user clicks on a location on the seek bar from which the user wishes to play the multimedia content. In such a scenario, the processor 202 may update the word cloud.

At step 602, a second input is received from the user. In an embodiment, the user may utilize the input device 210 to provide the second input. In an embodiment, the second input may include information pertaining to a timestamp from which the user wishes to play the multimedia content. Further, the second input may include the information pertaining to a second timestamp. The second timestamp may be indicative of the time at which the user wishes to stop/pause the playing of the multimedia content. In an alternate embodiment, the user may input the duration for which the user wishes the multimedia content to be played.

At step 604, the one or more words are extracted from the multimedia content based on the duration for which the user wishes to play the multimedia content. In an embodiment, the one or more words are extracted in a similar manner as described in step 302.

At step 304, the extracted one or more words are normalized. Thereafter at step 606, a word cloud is created. In an embodiment, the word cloud is created in a similar manner as discussed in step 306. A person having ordinary skill in the art would understand that since the one or more words are extracted only from a section of the multimedia content (determined based duration inputted by the user), the word cloud is created for the duration for which the user wishes to play the multimedia content.

Thereafter, the steps 308-312 are performed as explained in conjunction with the FIG. 3.

A person having ordinary skills in the art would understand that the method described in the flowchart 300 may be employed on the audio multimedia content. In such a scenario, the one or more words are extracted from the audio content directly. Further, the audio snippets may be extracted from audio content and accordingly played to the user (when selected by the user).

The disclosed embodiments encompass numerous advantages. Various embodiments of methods and systems for processing multimedia content. An advantage of the disclosure lies in fact that a user is provided with a word cloud of words that occur frequently within the multimedia content. The word cloud helps the user to navigate to a snippet/portion of interest within the multimedia content based on a selected word from the word cloud. Further, the words in the word cloud are presented based on a measure of emphasis laid on the words within the multimedia content. Hence, words that are strongly emphasized may be highlighted within the word cloud as compared with words that are not strongly emphasized. Presentation of the words in the word cloud based on their respective emphasis may help the user select a relevant portion from the multimedia content.

The disclosed methods and systems, as illustrated in the ongoing description or any of its components, may be embodied in the form of a computer system. Typical examples of a computer system include a general purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or similar devices that enable the computer system to connect to databases and networks such as LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The systems and methods described can also be implemented using only software programming, only hardware, or a varying combination of the two techniques. The disclosure is independent of the programming language and the operating system used in the computers. The instructions for the disclosure can be written in all programming languages including, but not limited to, "C," "C++," "Visual C++," and "Visual Basic". Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, with any product capable of implementing the above methods and systems, or the numerous possible variations thereof.

Various embodiments of the methods and systems for processing a multimedia content has been disclosed. However, it should be apparent to those skilled in the art that modifications, in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art that are also intended to be encompassed by the following claims.

What is claimed is:

1. A method for processing multimedia content, said method comprising:
   extracting, by one or more processors, one or more words from at least an audio stream associated with said multimedia content, wherein each of said one or more words has associated one or more timestamps indicative of temporal occurrences of each of said one or more words in said multimedia content;
   creating, by said one or more processors, a word cloud of said one or more words in said multimedia content based at least on a measure of emphasis laid on each of said one or more words in said multimedia content and said one or more timestamps associated with said one or more words, wherein at least a first dimension of said word cloud corresponds to a measure of temporal spread of each of said one or more words in said multimedia content; and
   presenting, by said one or more processors, one or more multimedia snippets, of said multimedia content, associated with a word selected by a user from said word cloud, wherein each of said one or more multimedia snippets corresponds to said one or more timestamps associated with occurrences of said word in said multimedia content.

2. The method of claim 1, wherein said word cloud is a multidimensional graph that includes at least said first dimension and a second dimension.

3. The method of claim 2, wherein said second dimension corresponds to a measure of a cumulative temporal occurrence of each word in said one or more words, wherein said cumulative temporal occurrence of each word is determined based on said one or more timestamps associated with occurrences of said each word in said multimedia content.

4. The method of claim 3, wherein said cumulative temporal occurrence comprises at least one of mean, or median.

5. The method of claim 1 further comprising presenting, by said one or more processors, said word cloud of said one or more words along with said multimedia content to said user.

6. The method of claim 5 further comprising receiving, by said one or more processors, a first input from said user based on said presentation of said word cloud of said one or more words, wherein said first input corresponds to a selection of said word from said word cloud of said one or more words.

7. The method of claim 6, wherein said first input comprises one or more gestures performed by said user on said word in said word cloud.

8. The method of claim 7 further comprising generating, by said one or more processors, an audio signal corresponding to said word based on said one or more gestures performed by said user.

9. The method of claim 1 further comprising highlighting, by said one or more processors, one or more portions of a seek bar associated with said multimedia content, wherein said one or more portions correspond to said one or more multimedia snippets.

10. The method of claim 1 further comprising representing, by said one or more processors, said measure of emphasis laid on each of said one or more words in said multimedia content by colors in said word cloud.

11. The method of claim 1 further comprising normalizing, by said one or more processors, said one or more words extracted from at least said audio stream associated with said multimedia content by text processing.

12. The method of claim 11, wherein said text processing comprises at least by removing stop words, or by transforming each of said one or more words in said multimedia content to stem form.

13. The method of claim 1 further comprising receiving, by said one or more processors, a second input from said user, wherein said second input corresponds to a selection of a second timestamp on said seek bar associated with said multimedia content, wherein said multimedia content is played from said second timestamp.

14. The method of claim 13 further comprising updating, by said one or more processors, said word cloud based on occurrences of said one or more words in a predefined time-window around said second timestamp.

15. The method of claim 13, wherein said second input comprises at least said one or more gestures performed by said user on said seek bar associated with said multimedia content.

16. The method of claim 1 further comprising changing, by said one or more processors, font size of said one or more words in said word cloud of said one or more words based on a frequency of occurrences of said one or more words in said multimedia content.

17. A system for processing multimedia content, said system comprising:
one or more processors operable to:
extract one or more words from at least an audio stream associated with said multimedia content, wherein each of said one or more words has associated one or more timestamps indicative of temporal occurrences of each of said one or more words in said multimedia content;
create a word cloud of said one or more words in said multimedia content based at least on a measure of emphasis laid on each of said one or more words in said multimedia content and said one or more timestamps associated with said one or more words, wherein at least a first dimension of said word cloud corresponds to a measure of temporal spread of each of said one or more words in said multimedia content; and
present one or more multimedia snippets, of said multimedia content, associated with a word selected by a user from said word cloud, wherein each of said one or more multimedia snippets corresponds to said one or more timestamps associated with occurrences of said word in said multimedia content.

18. The system of claim 17, wherein said word cloud is a multidimensional graph that includes at least said first dimension and a second dimension.

19. The system of claim 18, wherein said second dimension corresponds to a measure of a cumulative temporal occurrence of each word in said one or more words, wherein said cumulative temporal occurrence of each word is determined based on said one or more timestamps associated with occurrences of said each word in said multimedia content.

20. The system of claim 19, wherein said cumulative temporal occurrence comprises at least one of mean, median, or variance.

21. The system of claim 17, wherein said one or more processors are further operable to present said word cloud of said one or more words in said multimedia content to said user.

22. The system of claim 21, wherein said one or more processors are further operable to receive a first input from said user based on said presentation of said word cloud of said one or more words, wherein said first input corresponds to a selection of said word from said word cloud of said one or more words.

23. The system of claim 22, wherein said first input comprises one or more gestures performed by said user on said word in said word cloud.

24. The system of claim 17, wherein said one or more processors are further operable to highlight one or more portions of a seek bar associated with said multimedia content, wherein said one or more portions correspond to said one or more multimedia snippets.

25. The system of claim 17, wherein said one or more processors are further operable to represent said measure of emphasis laid on each of said one or more words in said multimedia content by colors in said word cloud.

26. The system of claim 17, wherein said one or more processors are further operable to receive a second input from said user, wherein said second input corresponds to a selection of a second timestamp on said seek bar associated with said multimedia content, wherein said multimedia content is played from said second timestamp.

27. The system of claim 26, wherein said one or more processors are further operable to update said word cloud based on occurrences of said one or more words in a predefined time-window around said second timestamp.

28. The system of claim 26, wherein said second input comprises at least said one or more gestures performed by said user on said seek bar associated with said multimedia content.

29. The system of claim 17, wherein said one or more processors are further operable to change font size of said one or more words in said word cloud of said one or more words based on a frequency of occurrences of said one or more words in said multimedia content.

30. A computer program product for use with a computer, the computer program product comprising a non-transitory computer readable medium, wherein the non-transitory computer readable medium stores a computer program code for processing multimedia content, wherein the computer program code is executable by one or more processors to:
extract one or more words from at least an audio stream associated with said multimedia content, wherein each of said one or more words has associated one or more timestamps indicative of temporal occurrences of each of said one or more words in said multimedia content;
create a word cloud of said one or more words in said multimedia content based at least on a measure of emphasis laid on each of said one or more words in said multimedia content and said one or more timestamps associated with said one or more words, wherein at least a first dimension of said word cloud corresponds to a measure of temporal spread of each of said one or more words in said multimedia content; and
present one or more multimedia snippets, of said multimedia content, associated with a word selected by a user from said word cloud, wherein each of said one or more multimedia snippets corresponds to said one or more timestamps associated with occurrences of said word in said multimedia content.

\* \* \* \* \*